Sept. 21, 1926.

A. GAGG

SPEED REGULATING DEVICE

Filed Dec. 28, 1921

Inventor:
Anton Gagg

Patented Sept. 21, 1926.

1,600,542

UNITED STATES PATENT OFFICE.

ANTON GAGG, OF ZURICH, SWITZERLAND.

SPEED-REGULATING DEVICE.

Application filed December 28, 1921, Serial No. 525,466, and in Switzerland January 11, 1921.

The invention relates to a regulating device for governing a servo-motor in which device auxiliary means urge a controlling member for the servo-motor towards its mid position, and the device is characterized by the fact that the action of the auxiliary means that tend to urge the controlling member towards the mid-position is limited so as to permit of the member being displaced out of its mid-position by a comparatively small amount before the auxiliary means start to become operative.

Regulating devices for governing a servo-motor in which a controlling member for the servomotor is continuously urged towards the mid-position by the action of auxiliary means provided to that end, for instance by springs or weights, and which controlling member can only be displaced out of said mid-position by overcoming the resistance of those auxiliary means are disclosed in the American Patent No. 1,423,786, dated July 25, 1922. With such known devices the controlling member is displaced by the action of an auxiliary member, for instance a governor sleeve moved by a pendulum governor, through the intermediary of a dash pot arrangement or the like. The combined action of the dash pot and the auxiliary means acting upon the controlling member ensures that the controlling member is only displaced when and as long as the auxiliary member moved by the pendulum governor moves at a certain minimum speed and that it is automatically returned into its mid-position as soon as the speed of the auxiliary means drops below the mentioned minimum speed. In consequence thereof every regulating action is automatically interrupted as soon as the acceleration of the power-engine drops below a determined value when the regulating device is utilized for instance for governing a servo-motor adapted to control a power engine.

Devices of this kind effect in a very advantageous manner an interruption of the movement of the servo-motor in the required and desired moment, but they present the disadvantage that by means of such devices a determined position of the movable part of the servo-motor is not attained without any further mechanism, as the action upon the servo-motor is solely dependent on the speed of the movement of the auxiliary member, for instance the pendulum sleeve, and not on the position of the latter. To overcome this drawback it has already been proposed, as also disclosed in the said American Patent No. 1,423,786 to provide a second regulating device of correspondingly smaller dimensions in addition to the regulating device acting in the described manner, which second regulating device has for its tasks to ensure the required or desired dependency of the position of the movable part of the servo-motor from that of the pendulum governor. The addition of a second regulating device implies of course in itself a disadvantage and further this second regulating device may give rise to oscillations during the regulating action from well known reasons as it is only dependent on the position of the governor.

These disadvantages are overcome by the device according to the present invention.

A constructional example of the device according to the invention is shown in the accompanying drawing, in which.

Figures 1, 2:
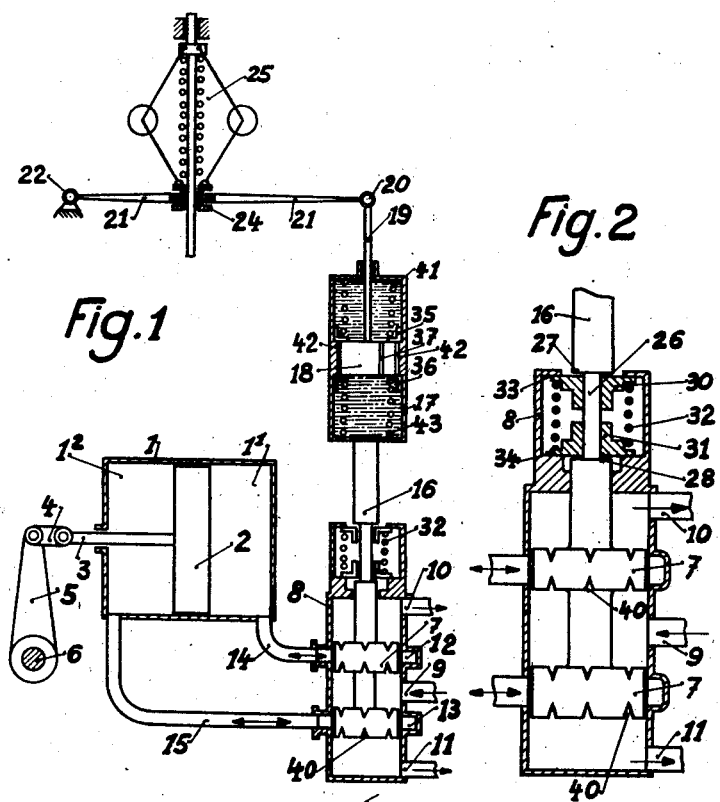
Fig. 1 is a diagrammatic view of the complete governing device in which a hydraulically operated servo-motor serving to regulate the speed of a power engine is influenced by a centrifugal governor.
Fig. 2 illustrates a detail of the governing means on a larger scale.

1 denotes a servo-motor cylinder within which a piston 2 is arranged displaceably in the axial direction. The piston 2 is connected by means of a piston rod 3 and link 4 to a lever 5, which transmits the movement of the servo-motor piston 2 to a main-regulating shaft 6, from which the regulating organs of a power engine, for instance a steam gans of a power engine, for instance a steam supply valve, movable guide vanes or the like are suitably actuated. The distribution of the pressure to both sides of the piston 2 is governed by a controlling member or valve 7, which is movably arranged within a casing 8 and which is provided with notches 40 along the edges of the periphery. The valve 7 forms the controlling member for the servo-motor 1, 2. To the casing 8 liquid under pressure is supplied by a conduit 9, the branches 10 and 11 serving for the discharge of the pressure liquid. In the casing 8 annular channels 12 and 13 are provided which are connected by means of the conduits 14 and 15 with the spaces $1^1$ and $1^2$ respectively of the cylinder 1. The controlling valve 7 is rigidly connected by means of a rod 16 with the casing 17 of a dash pot, the piston 18 of which is linked by means of a rod 19 to the outer end 20 of a regulating lever 21, which is adapted to turn about the fixed fulcrum pin 22, the turning motion being effected by the intermediary of a sleeve 24 of a centrifugal governor 25. The latter is rotated in a known manner, not shown in the drawing, by the power engine.

The connecting rod 16 is provided with a reduced part 26 (Fig. 2) which is limited at either end by the facings 27 and 28 acting as stops. On the part 26 two discs 30 and 31 are provided between which a helical spring 32 is arranged. The action of this spring 32 causes the discs 30 and 31 to be ordinarily pressed against the faces 33 and 34 of the casing 8 of the controlling valve. In the mid-position of the controlling valve 7 a small clearance (Fig. 2) is present between the stop 27 and the disc 30 on the one hand and between the stop 28 and the disc 31 on the other hand, by the amount of which clearance the regulating valve 7 can be moved in the upward and downward direction without it being necessary to overcome any resistance of the spring 32. Inside the dash-pot casing 17 springs 41 and 43 are provided which bear with their one end on the upper and lower end part respectively of the casing 17 and with their other end on the rings 35 and 36 respectively. The rings 35 and 36 rest, when the piston 18 is in its mid-position with regard to the casing 17, on stop faces 42 formed by the middle portion of the casing 17 which portion is of smaller inside diameter than the other parts of the casing, so that the piston 18 of the dash pot is held in the mentioned mid-position with regard to the casing 17. The pressure of the springs 41 and 43 is somewhat smaller than that of spring 32. The dash-pot piston 18 is provided with a small bore 37 through which the liquid contained in the dash-pot may pass from one side of the piston 18 to the other.

The operation of the above described device will now be explained with reference to the accompanying drawings. In the diagram in Fig. 3 of this drawing the abscissæ measured from left to right represent the time $t$ of the regulating action and the ordinates represent firstly the admission opening $o$ of the main supply organ of the power engine and secondly the number of revolutions $n$ of this engine. Let it be assumed that up to the time $t_1$ a state of persistence or repose of the engine is present, the admission opening of the main supply organ being $o_1$ and the speed $n_1$. At the time $t_1$ this state of persistence shall be disturbed upon load being taken off the engine. In consequence thereof an acceleration of the engine instantly occurs. Therefore the sleeve 24 of the centrifugal governor 25 is raised causing the lever 21 to be raised and to turn about its fulcrum pin 22. At the beginning of the upward movement of the lever 21, when the dash-pot piston is caused to take part in said movement by the rod 19, the dash-pot casing 17 together with the controlling piston 7 connected thereto is also raised in consequence of the tension imparted to the upper spring 41 in the dash-pot. However as soon as the stop 28 comes to rest against the disc 31 a further movement of the controlling piston 7 in the upward direction can only occur by overcoming the pressure of the spring 32, i. e. when a liquid pressure is present above the dash-pot piston 18 which together with the pressure of the upper spring 41 gives a power that is greater than the resistance due to the pressure of spring 32 which counteracts a displacement of piston 7. The pressure above the piston 18 is solely dependent on the speed at which the piston 18 moves in an upward direction within the casing 17. The higher this speed is, the higher is of course the pressure that is required in order to force the liquid to be displaced in the dash-pot through the bore 37 of the piston 18. As soon as the velocity with which the piston 18 moves in the upward direction drops below a determined degree the pressure above the piston 18 will become so small that the controlling piston 7 is urged in the downward direction i. e. towards its mid-position by the influence of the spring 32. By suitably choosing the spring pressures and the diameter of the bore 37 in the piston 18 the urging back of the controlling piston may be effected at the desired moment. Advantageously the ratios are so chosen that the controlling piston 7 remains wholly displaced from the time $t_1$ to the time $t_2$ (Fig. 3) and that at approximately the time $t_2$ at which the speed of the upward movement of the piston 18 has already substantially decreased, the controlling piston starts its return movement so that it is again approximately in its mid-position when the culminating point $n_3$ of the $n$ curve is reached which is the case at the time $t_3$. On account of the regulating action described pressure liquid has been supplied to the right-hand portion of the servo-motor 1, i. e. to the space $1^1$, during the interval between the time $t_1$ to $t_3$, whilst the space $1^2$ has been connected to the discharge during said interval. In consequence thereof the piston 2 has been displaced from right to left and has thereby decreased the admission opening of the main supply member of the engine from $o_1$ to $o_3$. At the time $t_3$ no acceleration of the engine takes place and the engine runs at least under certain conditions with the proper admission corresponding to the new load, but the number of revolutions $n$ of the engine is still too high at that moment.

As has been explained above, the controlling valve 7 has returned in a downward direction by the action of the spring 32 when the acceleration of the engine has ceased and the quick movement of the piston 2 towards the left has been interrupted. However, the controlling valve 7 returns in that downward direction under the influence of the spring 32 only so far until the disc 31 comes to rest against the stop lacing 34 of the casing 8. The controlling valve 7 then remains under the influence of the compressor upper spring 41 in the dash-pot 17, 18 displaced in the upward direction by the small amount of the clearance that is present between the face 28 of the connecting rod 16 and the disc 31 when the controlling valve is in its mid-position. Thereby the notches 40 provided at the edge of the controlling valve are still in action and the piston 2 is slowly moved further to the left to further decrease the admission of the engine. In consequence thereof a decrease of the speed results thereby, in the manner disclosed in the American Patent No. 1,180,583 shortly after the culminating point $n_3$ of the $n$ curve is passed, for instance at the time $t_4$ the controlling valve 7 is also returned by the small amount by which it was still displaced in the upward direction after its return movement under the influence of the spring 32, i. e. it is returned into its mid-position, whereby the complete interruption of the closing movement of the piston 2 is effected.

If the speed of the engine decreases owing to an increase in the load, the respective regulating action takes place in the reversed manner.

Figures 3, 4:
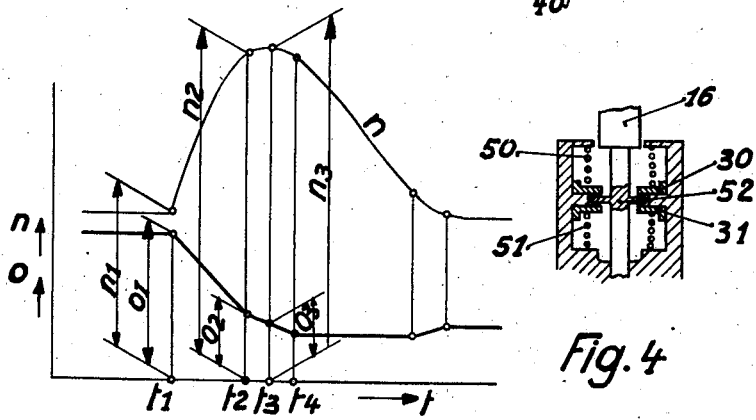
Fig. 3 shows diagrams illustrating the manner of operation of the regulating device.
Fig. 4 is a modification of a detail.

The regulating device may be subjected to constructional modifications without altering the nature of the invention. In this way, for instance, as is shown in Fig. 4, a separate spring 50 and 51 respectively acts upon each disc 30 and 31, in which case a member 52 rigidly connected to the connecting rod 16 is interposed between said discs.

The main regulating shaft 6 may of course influence any organs, for instance organs adapted to damp the oscillating movements of parts such as rolling movements of ships.

I claim:

1. A governing device for servomotors, comprising an auxiliary member the position of which is dependent on the working conditions to be regulated, a member for controlling the movement of a piston of the servomotor, auxiliary means which are independent of the movement of the servomotor piston and which tend to urge the controlling member into its mid-position, means operatively connecting said controlling member to said auxiliary member and adapted to effect, while influencing said auxiliary means, a displacement of said controlling member out of its mid-position as soon as the velocity with which the auxiliary member is moved in one or the other direction exceeds a certain limit, and being further adapted to keep said controlling member out of its mid-position as long as said velocity is exceeded, and means to limit the action of said auxiliary means so as to permit the controlling member to be displaced out of its mid-position by a comparatively small amount before the auxiliary means acts on said controlling member.

2. A governing device for servo-motors, comprising an auxiliary member the position of which is dependent on the working conditions to be regulated, a member for controlling the movement of a piston of the servomotor, a spring adapted to act upon said controlling member independently of the movement of the servomotor piston and which spring tends to urge the controlling member into its mid-position, means operatively connecting said controlling member to said auxiliary member and adapted to effect, while influencing said spring, a displacement of the controlling member out of its mid-position as soon as the velocity with which the auxiliary member is moved in one or the other direction exceeds a certain limit, and being further adapted to keep said controlling member out of its mid-position as long as the velocity is exceeded, and means to limit the action of said spring so as to permit the controlling member to be displaced out of its mid-position by a comparatively small amount before the spring acts on said controlling member.

3. A governing device for servomotors, comprising an auxiliary member the position of which is dependent on the working conditions to be regulated, a casing, a controlling piston for the servomotor, the piston being movable in said casing and provided with notches along the edges, a spring adapted to act upon said controlling piston independently of the movement of the servomotor piston and which spring tends to urge said controlling piston into its mid-position, means operatively connecting said controlling piston to said auxiliary member and adapted to effect while influencing said spring a displacement of said controlling piston out of its mid-position as soon as the velocity with which the auxiliary member is moved in one or the other direction exceeds a certain limit, and being further adapted to keep said controlling piston out of its mid-position as long as said velocity is exceeded, the controlling piston being freely movable for a comparatively small amount out of its mid-position before said spring acts on it.

4. A governing device for servomotors, comprising a governor controlled by the machine served by the servomotor, a valve casing for the servomotor, a piston valve in said casing, a spring controlling said valve and means to permit limited independent movement of the valve with respect to said spring, and means operatively connecting the valve and governor to compress said spring after the independent movement has been effected, the valve and its associated parts being free of mechanical connection with the operating parts of the servomotor.

In testimony whereof I affix my signature.

ANTON GAGG.